United States Patent [19]

Starmer

[11] Patent Number: 4,529,766
[45] Date of Patent: Jul. 16, 1985

[54] CARBOXYLATED RUBBER COMPOSITION CONTAINING SCORCH INHIBITOR

[75] Inventor: Philip H. Starmer, Avon Lake, Ohio

[73] Assignee: The B. F. Goodrich Company, Akron, Ohio

[21] Appl. No.: 618,702

[22] Filed: Jun. 8, 1984

[51] Int. Cl.³ ............................................. C08K 5/11
[52] U.S. Cl. .................... 524/310; 525/346; 525/354
[58] Field of Search ............... 524/308, 310, 320, 112, 524/560, 572, 576, 821; 526/317; 525/386, 346, 354

[56] References Cited

U.S. PATENT DOCUMENTS

| | | | |
|---|---|---|---|
| 2,058,840 | 10/1936 | Thies | 525/346 |
| 2,131,127 | 9/1938 | ter Horst | 525/346 |
| 2,360,896 | 10/1944 | Sarbach | 524/308 |
| 2,395,017 | 2/1946 | Semon | 526/317 |
| 2,435,853 | 2/1948 | Sutherland | 525/386 |
| 2,471,818 | 5/1949 | Hunter et al. | 526/317 |
| 2,524,424 | 10/1950 | Buret | 525/386 |
| 2,698,318 | 12/1954 | Brown | 526/317 |
| 2,849,426 | 8/1958 | Miller | 525/354 |
| 3,226,356 | 12/1965 | Kehr et al. | 524/576 |
| 3,321,429 | 5/1967 | Thörmer et al. | 524/576 |
| 3,403,136 | 9/1968 | Baker | 525/354 |
| 3,578,614 | 5/1971 | Wszolek | 525/346 |
| 3,972,867 | 8/1976 | Dawans et al. | 525/386 |
| 3,974,129 | 8/1976 | De La Mare | 525/386 |
| 4,173,552 | 11/1979 | Kuceski et al. | 525/386 |
| 4,292,228 | 9/1981 | Isley | 524/112 |
| 4,415,690 | 11/1983 | Grimm | 524/112 |

*Primary Examiner*—Veronica P. Hoke
*Attorney, Agent, or Firm*—George A. Kap; Alan A. Csontos

[57] ABSTRACT

A preferred carboxylated nitrile rubber is prepared by polymerizing a diene, a nitrile and a small amount of an acrylic acid, which rubber has distributed therethrough an amount of alkyl or alkenyl monocitrate to obtain improved scorch time and reduced cure time.

20 Claims, No Drawings

CARBOXYLATED RUBBER COMPOSITION CONTAINING SCORCH INHIBITOR

BACKGROUND OF THE INVENTION

Carboxylated rubbers are polymers of a diene, a nitrile, and a monounsaturated carboxylic acid. In a preferred embodiment, carboxylic rubbers are carboxylic nitrile rubbers that are polymers of butadiene, acrylonitrile, and an acrylic acid. Carboxyl modification of nitrile rubber results in a material that has outstanding abrasion resistance. Such carboxyl modification of a rubber typically involves the addition of about 0.75 to 15 percent by weight of a monounsaturated carboxylic acid to the monomer charge being synthesized.

These carboxylated elastomers can be vulcanized in a manner analogous to their uncarboxylated counterparts utilizing a sulfur curing agent. In addition to this, if a polyvalent radical, and particularly a divalent metal, is available in the vulcanization recipe, the carboxyl groups in the polymer chain can take part in this cross-linking reaction. It is desirable to have a divalent metal in the vulcanization recipe since metal oxide vulcanizates of carboxylic rubbers or elastomers have unusually high tensile strength, superior ozone resistance, and elevated modulus values. This cross-linking reaction is fast in the presence of divalent metals and scorch problems are often encountered. Even at room temperature, carboxylated rubbers will often unintentionally cure in 48 hours or less in the presence of zinc oxide when uninhibited. Since scorch or the premature cross-linking of an elastomer can render a rubber completely unworkable, it is necessary to control this cross-linking reaction between carboxyl groups on the polymer chain.

U.S. Pat. No. 4,415,690 to Grimm discloses the use of alkyl and alkenyl succinic acids and their anhydrides in carboxylic rubber compositions to improve scorch resistance of such rubbers. Amount of the scorch inhibitor in the compositions can vary up to about 5 parts per 100 parts of rubber, on weight basis, preferably 0.1 to 1.5 phr. Although the succinic acid derivatives disclosed in the Grimm patent perform admirably as scorch inhibitors in carboxylic rubber compositions, such compositions also have cure time that is too long, and, therefore, undesirable. For instance, an uninhibited commercial carboxylic nitrile rubber composition has a cure time ($t_{90}$) at 170° C. of 6.7 minutes whereas another commercial nitrile rubber composition inhibited with a scorch inhibitor disclosed in the Grimm patent has a cure time ($t_{90}$) at 170° C. of about twice as long, or 13.5 minutes. Such a large increase in cure time is undesirable in a commercial environment since it substantially reduces productivity and concomitantly increases cost of the resulting products.

SUMMARY OF THE INVENTION

Carboxylated elastomers that are prepared by polymerizing a diene, a nitrile, and an unsaturated monocarboxylic acid, also contain an effective amount of an alkyl or alkenyl citrate for improved or longer extended scorch time and reduced cure time. More specifically, the invention disclosed herein relates to a process for preparing carboxylic rubber compositions and to the compositions themselves containing an effective amount of a scorch inhibitor selected from derivatives of citric acid, and particularly monoesters, diesters, and mixtures thereof of citric acid. The inhibited compositions disclosed herein have scorch times and cure times between the commercial uninhibited carboxylic rubbers and commercial carboxylic rubbers inhibited or containing scorch inhibitors selected from derivatives of succinic acid disclosed in the Grimm patent.

DETAILED DESCRIPTION OF THE INVENTION

The invention disclosed and claimed herein relates to carboxylic rubber compositions and process for its preparation wherein the composition has uniformly distributed therein one or more derivatives of citric acid that function as scorch inhibitors and also cure accelerators. The compositions disclosed herein generally have scorch times and cure times between those of uninhibited carboxylic rubber compositions and carboxylic rubber compositions containing scorch inhibitors disclosed in the Grimm U.S. Pat. No. 4,415,690.

It has been experimentally verified that the compositions claimed herein can obtain scorch times and cure times between the uninhibited carboxylic nitrile rubber compositions and carboxylic nitrile rubber compositions having uniformly distributed therethrough scorch inhibitors of the Grimm patent. Mooney scorch experiments were conducted at 125° C. on rubber samples and torque was plotted against time, which plots were used to obtain time readings for obtaining torques at 5 points above the minimum torques shown on the plots, i.e., $t_5$. It has been determined that the $t_5$ value for the commercial uninhibited carboxylic rubbers composition is 5.8 minutes, for the commercial compositions containing scorch inhibitors of the Grimm patent $t_5$ is 22.4 minutes, and for the compositions containing the herein-disclosed inhibitors $t_5$ is 12.1 minutes. Considering only the scorch characteristics, the compositions showing the longer $t_5$ values are superior to the compositions with shorter $t_5$ values since it takes considerably longer for scorch to take place. However, although scorch characteristics of the compositions containing scorch inhibitors of the Grimm patent were superior to the other compositions tested, their corresponding cure times were much longer, and therefore, undesirable. Rheometer cure experiments conducted at 170° C. on the compositions in question have verified cure times obtained at 90% cure, i.e., $t'_{90}$. For uninhibited commercial carboxylic nitrile rubber compositions, $t'_{90}$ was 6.7 minutes whereas for commercial carboxylic nitrile rubber compositions containing scorch inhibitors of the Grimm patent, $t'_{90}$ was 13.5 minutes, or about twice as long as the uninhibited compositions. Interestingly enough, the carboxylic nitrile rubber compositions having uniformly dispersed therein the scorch inhibitors disclosed and claimed herein had $t'_{90}$ of 8.0 minutes, which is closer to $t'_{90}$ of 6.7 minutes for the uninhibited compositions than the $t'_{90}$ of 13.5 minutes for the composition containing Grimms' scorch inhibitors.

The carboxylic rubber composition of the invention herein contains an effective amount of one or a mixture of chemical agents selected from derivatives of citric acid. Amount of the chemical agent used should be sufficient to obtain an improved scorch resistance or longer scorch time when compared to commercial uninhibited carboxylic rubber compositions and to obtain an improved or shorter cure time when compared to commercial carboxylic rubber compositions containing the scorch inhibitors disclosed in the Grimm U.S. patent. More specifically, derivatives of citric acid described herein can impart improved scorch resistance and shorter curing time to carboxylic rubbers at a level of up to about 5 parts per 100 parts of rubber (phr), on weight basis. The derivatives of citric acid can provide adequate scorch safety and shorter cure times when used at lower concentrations in the range of about 0.1 to 3 phr. The optimum amount of citric acid derivatives needed will vary with the degree of carboxylation in the rubber being treated and with processing conditions that will ultimately be employed in manufacturing the carboxylic rubber compositions into useful products such as oil line savers and swab cups.

The citric acid derivatives useful herein are the alkyl and alkenyl citrates and anhydrides thereof wherein the alkyl and alkenyl groups contain 8 to 25 carbon atoms, preferably 12 to 20 carbon atoms. The alkenyl groups can contain more than a single unsaturation. Monocitrates and dicitrates are included although in the case of stearyl citrate, it is believed that it is the monocitrate that is active for scorch resistance and for obtaining a shorter cure time. The commercial monocitrates, such as monostearyl citrate, contain a mixture of mono- and dicitrates. It is believed that the tricitrates are not suitable herein. The tristearyl citrate, for instance, is a known plasticizer.

Suitable monocitrates for purposes herein are generally defined as having the following structural formula:

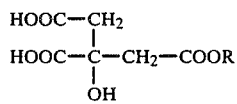
(Formula I)

where R is selected from alkyl and alkenyl groups containing 8 to 25 carbon atoms, preferably 12 to 20 carbon atoms. Mixtures of such compounds can also be used. Suitable compounds are oil-soluble and can be added to the latex prior to coagulation or to the rubber composition during the milling operation. Specific examples of suitable citrates include monostearyl citrate, monolauryl citrate, and monooleyl citrate.

In the context of this invention, it is surprising that the herein-disclosed chemical agents are suitable for improving scorch resistance and for reducing cure time of carboxylic rubber compositions since conventional retarders, such as salicylic acid, benzoic acid, phthalic anhydride, and N-cyclohexyl thiophthalimide, do not retard scorch of carboxylic rubber compositions containing a divalent metal oxide, and in fact, reduce the scorch time. The function of the conventional retardants in this context appears to be consonant with the findings of the Grimm U.S. patent with respect to some of the same materials that were tested there. Furthermore, basic materials, such as triethanolamine, reduce scorch time of carboxylic rubber compositions.

A typical monomer charge for preparing carboxylic rubber contains 67% butadiene, 26% acrylonitrile, and 7% methacrylic acid. In addition to or in place of butadiene, other conjugated dienes can be used which are defined as follows:

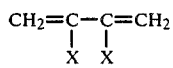

where each X can individually be a hydrogen; a halogen such as chlorine; an alkyl radical of 1 to 5 carbon atoms; or an aryl radical, particularly phenyl. Suitable nitriles, in addition to acrylonitrile, include α,β-monoolefinically unsaturated acrylic nitriles defined as follows:

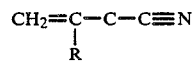

where R is selected from hydrogen; halogens such as chlorine; and alkyl radicals of 1 to 8 carbon atoms, preferably 1 to 2 carbon atoms; and aryl radicals, preferably phenyl. Preferred dienes include butadiene, chloroprene, and isoprene whereas preferred nitriles include acrylonitrile, chloroacrylonitrile, alpha(2-cyanoethyl)acrylonitrile also known as methylene glutaronitrile, methacrylonitrile, and ethacrylonitrile.

The unsaturated carboxylic acids, preferably monounsaturated monocarboxylic acids, are selected from acrylic acid, methacrylic acid, sorbic acid, β-acryloxypropanoic acid, ethacrylic acid, 2-ethyl-3-propyl acrylic acid, vinyl acrylic acid, cinnamic acid, maleic acid, fumaric acid, and the like. Particularly preferred carboxylic acids for purposes herein include acrylic acid, and methacrylic acid.

The carboxylic rubbers generally contain 0.75% to 15% by weight of chain linkages derived from the unsaturated carboxylic acid. Amount of the polymerized diene in the carboxylic rubber generally exceeds 40% by weight of the rubber, preferably in excess of about 60% by weight, with remainder of the rubber being polymerized nitrile. Amount of the polymerized nitrile is generally in the range of about 5 to 35% by weight.

Other monomers that can be polymerized with a suitable unsaturated carboxylic acid in place of, in addition to, or as partial substitutes to the principal monomers of a diene and a nitrile include styrene; isoprene; vinylidene monomers having one or more terminal $CH_2=C<$ groups; vinyl aromatics such as α-methylstyrene, bromostyrene, chlorostyrene, chloromethyl styrene, fluorostyrene, vinylphenol, 3-hydroxy-4-methoxystyrene, vinylanisole, β-nitrostyrene, and the like; α-olefins such as ethylene; vinyl halides, such as vinylbromide, chloroethene or vinylchloride, vinylfluoride, vinyliodide, 1,2-dibromoethane, 1,1-dichloroethylene (vinylidene chloride), 1,2-dichloroethylene, and the like; vinyl esters such as vinyl acetate; alkyl acrylates such as methyl acrylate, ethyl acrylate, methyl methacrylate, and butyl acrylate; α,β-olefinically unsaturated amides such as acrylamide, N-methyl acrylamide, N-t-butyl acrylamide, N-cyclohexyl acrylamide, diacetone acrylamide, methacrylamide, N-ethyl methacrylamide, and the like; α,β-olefinically unsaturated N-alkylol amides having the general structural formula:

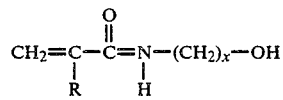

wherein R is a hydrogen atom or an alkyl group containing from 1 to 4 carbon atoms and x is an integer from 1 to 4 inclusive, such as N-methylol acrylamide, N-ethylol acrylamide, N-propylol acrylamide, N-methylol methacrylamide, N-ethylol methacrylamide, and the like; vinyl pyridine; n-octyl methacrylate, dodecyl methacrylate, methyl ethacrylate, and ethylethacrylate;

haloalkyl acrylates such as chloropropyl acrylate; methacrylates; hydroxyethylacrylate; and polyfunctional compounds such as ethylene glycol dimethacrylate, diethylene glycol diacrylate, divinylbenzene, alkenyl pentaerythritol, methylene-bis-acrylamide, and the like.

The carboxyl modified polymers which are generally preferred include carboxylated nitrile rubbers which are polymers of butadiene, acrylonitrile, and methacrylic acid; terpolymers of methacrylic acid, styrene, and butadiene; copolymers of methacrylic acid and butadiene; copolymers of methacrylic acid and isoprene; terpolymers of acrylic acid, acrylonitrile, and butadiene; and terpolymers of methacrylic acid, vinylidene chloride, and butadiene.

In the polymerization of unsaturated carboxylic acids of the acrylic acid type with one or more of the above mentioned monomers, there can be competing or side reactions which take place. Therefore, the choice of reactants, process conditions, order of addition of reactants and the like, should be selected in order to produce a useful rubber containing carboxyl groups. The monomers employed and monomer ratios used in the charge composition for the polymerization should be selected in a manner that will produce a carboxylated elastomer. It should be noted that many combinations of the above-mentioned monomers will result in the polymerization of a nonelastomeric polymer.

The carboxylic rubbers can be synthesized using any conventional polymerization technique. Emulsion polymerization of carboxylated elastomers is generally preferred and is used almost exclusively in industrial production. This type of a synthesis generally utilizes a charge composition comprising water, monomers, an initiator, and an emulsifier. Such polymerizations can be run over a very wide temperature range from about 0° C. to as high as 100° C. Very good results have been obtained when polymerizations are run at a temperature from about 5° C. to 60° C.

The polymerization of these carboxylated rubbers can be initiated using free radical catalysts, ultraviolet light, or radiation. To insure a satisfactory polymerization rate, uniformity, and a controllable polymerization, free radical initiators are generally used with good results. Free radical initiators which are commonly used include the various peroxygen compounds such as potassium persulfate, sodium persulfate, ammonium persulfate, benzoyl peroxide, hydrogen peroxide, di-t-butylperoxide, dicumyl peroxide, 2,4-dichlorobenzoyl peroxide, decanoyl peroxide, lauroyl peroxide, cumene hydroperoxide, p-menthane hydroperoxide, t-butylhydroperoxide, acetyl acetone peroxide, methyl ethyl ketone peroxide, succinic acid peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds; the various alkyl perketals. Cumene hydroperoxide can be used as an initiator to obtain very good results in the polymerization of carboxylated nitrile rubber.

Amount of the initator generally used in polymerization of this type is in the range of 0.001 to 1.000%, preferably 0.01 to 0.10%, based on the weight of the monomer charge.

The emulsifiers used in the polymerization of such polymers may be charged at the outset of the polymerization or may be added incrementally or by proportioning, as the reaction proceeds. Generally, anionic emulsifier systems provide good results, however, any of the general types of anionic, cationic or nonionic emulsifiers may be employed in the polymerization.

Among the anionic emulsifiers that can be employed in emulsion polymerizations are fatty acids and their alkali metal soaps such as caprylic acid, capric acid, pelargonic acid, lauric acid, undecylic acid, myristic acid, palmitic acid, margaric acid, stearic acid, arachidic acid, and the like; amine soaps of fatty acids such as those formed from ammonia, mono- and di-alkyl amines, substituted hydrazines, guanidine, and various low molecular weight diamines; chain-substituted derivatives of fatty acids such as those having alkyl substituents; naphthenic acids and their soaps and the like; sulfuric esters and their salts, such as the tallow alcohol sulfates, coconut alcohol sulfates, fatty alcohol sulfates, such as oleyl sulfate, sodium lauryl sulfate and the like; and other suitable surfactants, including those defined in col. 4 of the Grimm U.S. Pat. No. 4,415,690.

Amount of a suitable surfactant in such polymerizations varies from 0.5 to 5%, preferably 1 to 3%, based on the weight of the monomer charge.

The emulsion polymerization system used in the synthesis of carboxylated rubbers can be treated at the desired degree of conversion with shortstopping agents, such as hydroquinone. Typical shortstopping agents will not interfere with the action of the citrate derivatives described herein. Typical stabilizing agents and standard antioxidants can also be added to the emulsion of a carboxylated rubber without interfering with the action of the citrate derivatives as scorch inhibitors.

After the emulsion polymerization has been completed, many conventional coagulating techniques can be employed. Normally, such latexes are coagulated with reagents which insure the preservation of the carboxyl groups of the elastomers as acidic moieties. Coagulation with acids or blends of salts with acids is usually very satisfactory. For example, sulfuric acid, hydrochloric acid, blends of sodium chloride with sulfuric acid, and blends of hydrochloric acid with methanol are very effective as coagulating agents for carboxylated rubber emulsions.

After coagulation, washing may be employed to remove excess soap and/or electrolyte from the carboxylated rubber. Sometimes, washing is also useful in adjusting the pH of the carboxylated elastomer that has been synthesized. After washing, if it is desired, the elastomer can be dewatered. If it is desirable to do so, the carboxylated rubber can also be dried and baled after dewatering using conventional techniques.

Normally, a metal oxide such as zinc oxide, magnesium oxide, lead oxide, calcium oxide or cadmium oxide, usually zinc oxide, is mixed into a carboxylated rubber after it has been dried and baled for the purpose of giving enhancement of abrasion resistance, tensile strength, and tear strength. Generally, suitable metal oxides are oxides of elements of Groups IIA and IIB, and lead. Usually, from about 0.5 to 10 parts of the metal oxide per hundred parts rubber is employed. Excellent results are obtained using about 5 phr of zinc oxide. This process of mixing the zinc oxide into the rubber is usually carried out by utilizing a Banbury mixer; however, any other procedure that will adequately mix the zinc oxide with the carboxylated rubber can also be employed. Normally, it is advantageous to minimize the time period between the point when the zinc oxide is added and the time at which the carboxylated rubber will be vulcanized or cross-linked. By minimizing this time period, the amount of time in which spontaneous cross-linking between carboxyl groups can occur is minimized. Since unwanted cross-linking or scorch often occurs in the processing equipment before it is desired, the time at which the metal oxide is added is not a total solution to the problem.

By distributing or mixing the citrate derivatives uniformly throughout a carboxylated rubber, a scorch resistant carboxylic rubber composition is produced with the problem of premature cross-linking or scorch being greatly reduced. These citrate derivatives can be mixed into dried rubber using any procedure that will result in a thorough mixing. Good results have been obtained by mixing alkenyl citrate anhydrides into dried rubber with a Banbury mixer. The citrate derivatives described herein can also be mixed into the emulsion of a carboxylic rubber prior to coagulation. In this manner, excellent mixing and dispersion of the citrate derivatives is obtained.

The examples set forth below illustrate the invention disclosed and claimed herein particularly with respect to obtaining improved scorch time as compared to commercial uninhibited carboxyl nitrile rubber composition and with respect to obtaining a shorter cure time when compared with commercial carboxylic nitrile rubber composition containing a scorch inhibitor disclosed in the Grimm U.S. Pat. No. 4,415,690.

EXAMPLE 1

A commercial uninhibited carboxylic nitrile rubber composition was used herein for comparison testing was Hycar 1072 product sold by The B.F. Goodrich Company. Hycar 1072 carboxylic rubber was prepared in the manner described in the Examples of the Grimm U.S. Pat. No. 4,415,690 from the following components, given in weight parts:

| | |
|---|---|
| Polymer | 100 |
| SRF Carbonblack Filler (N774) | 30 |
| Stearic Acid Activator | 1 |
| Di(2-ethylhexyl)phthalate Plasticizer | 5 |
| Process Aid (Strucktol WB 212) | 2 |
| Spider Sulfur | 1.5 |
| Benzothiazole (MBTS) Accelerator | 1.5 |
| Tetramethyl Thiuram Monosulfide Curative | 0.25 |
| Zinc Oxide (Protox 169) Activator | 5.0 |

Samples of inhibited Hycar 1072 rubber composition were also prepared by incorporating on the mill 1.0 phr of monostearyl citrate where the R in formula I is the alkyl radical $C_{18}H_{37}$. The monostearyl citrate was purchased and was indicated to have a neutralization number of 110, moisture of 0.08%, saponification number of 160, and melting point of 47.8° C. The commercial carboxylic nitrile rubber containing scorch inhibitor disclosed in the Grimm U.S. Pat. No. 4,415,690 was Chemigum NX775, preparation of which is described in the Grimm patent.

The samples were then tested to determine their Mooney Scorch values at an operating temperature of 125° C. using the ASTM Method D1077. The values given in Table I, below, are in terms of minutes of time required to achieve a 5-point rise in torque above a minimum value:

TABLE I

| Sample | $t_5$ |
|---|---|
| uninhibited Hycar 1072 rubber composition | 5.8 minutes |
| Hycar 1072 rubber composition with monostearyl citrate | 12.1 minutes |
| Chemigum NX775 with Grimms scorch inhibitor | 22.4 minutes |

As is apparent from the above data, Chemigum NX775 carboxylic nitrile rubber, containing the scorch inhibitor disclosed in the Grimm patent, had $t_5$ value of 22.4 minutes whereas the untreated or uninhibited Hycar 1072 carboxylic nitrile rubber had $t_5$ value of only 5.8 minutes. These values show that the uninhibited Hycar 1072 rubber has little scorch resistance when compared to scorch resistance of Chemigum NX775 rubber.

Again, samples of the carboxylic nitrile rubbers were prepared, as described above, and then subjected to the Rheometer Cure test at 170° C., pursuant to ASTM test D-2084. The time required to reach 90% cure, referred to as $t'_{90}$, is given in Table II, below:

TABLE II

| Sample | $t'_{90}$ |
|---|---|
| uninhibited Hycar 1072 rubber composition | 6.7 minutes |
| Hycar 1072 rubber composition with monostearyl citrate | 8.0 minutes |
| Chemigum NX775 with Grimms' scorch inhibitor | 13.5 minutes |

The above data shows that although Chemigum NX775 rubber has superior scorch resistance, its cure time of 13.5 minutes is too long compared to the uninhibited Hycar 1072 rubber that had cure time of 6.7 minutes. The inhibited Hycar 1072 rubber had cure time of 8.0 minutes.

EXAMPLE 2

In another series of tests, 100 parts Hycar 1072 rubber latex was compounded with 1 part Santowhite Crystals antioxidant, 1 part monostearyl citrate scorch inhibitor, coagulated at pH of 2-3 with a polyamine coagulant, and passed through extruder for dewatering. Results comparing characteristics of Chemigum NX775 rubber and the inhibited Hycar 1072 rubber are given in Table III, below:

TABLE III

| | Chemigum NX775 | Inhibited Hycar 1072 |
|---|---|---|
| Mooney Visc. ML-4 @ 100° C. | 47 | 42 |
| Carboxyl % ephr | 0.069 | 0.072 |
| *Mooney Scorch @ 125° C. | | |
| original, $t_5$ | >30 min. | 23.0 min. |
| 1-day, $t_5$ | 18.5 min. | 18 min. |
| 3-days, $t_5$ | 10.2 min. | 13 min. |
| 7-days, $t_5$ | 7.7 min. | 10.3 min. |
| 14-days, $t_5$ | 6.6 min. | 9.7 min. |
| 21-days, $t_5$ | 4.0 min. | 7.6 min. |

*The samples were shelf-aged at 40° C., 100% RH.

The above data also demonstrates the rapid deterioration of Chemigum NX775 rubber composition relative to the inhibited Hycar 1072 rubber composition in terms of scorch time of samples subjected to a severe environment of 40° C. and 100% relative humidity. As the data illustrates, although the Chemigum NX775 rubber composition starts off ahead of the treated Hycar 1072 rubber composition, the latter reaches approximate equivalency in terms of scorch resistance in 1 to 3 days of shelf storage and thereafter shows improved scorch resistance whereby after 21 days of testing, the Chemigum NX775 product has a $t_5$ of 4.0 minutes whereas the treated Hycar 1072 product has $t_5$ value of 7.6 minutes, indicating better scorch resistance.

I claim:

1. A carboxylated rubber composition having improved scorch resistance and shorter cure time comprising a carboxylic rubber and an effective amount for obtaining improved scorch resistance and shorter cure time of at least one chemical agent distributed throughout, said chemical agent is selected from saturated and unsaturated aliphatic monoesters, diesters, and mixtures thereof of citric acid, each of said aliphatic groups independently containing about 8 to 25 carbon atoms.

2. Composition of claim 1 wherein said aliphatic groups each contain about 12 to 20 carbon atoms.

3. Composition of claim 2 wherein amount of said chemical agent is in the range of about 0.1 to 5 weight parts per 100 parts of rubber (phr), said composition also including 0.5 to 10 phr of a metal oxide distributed throughout said rubber composition for the purpose of giving enhancement of abrasion resistance, tensile strength and tear strength.

4. Composition of claim 3 wherein said metal oxide is selected from divalent metal oxides.

5. Composition of claim 4 wherein said metal oxide is selected from oxides of lead, and oxides of elements of Groups IIA and IIB of the periodic Table.

6. Composition of claim 1 wherein said carboxylated rubber is selected from terpolymers of butadiene, acrylonitrile, and methacrylic acid; terpolymers of butadiene, styrene, and methacrylic acid; terpolymers of butadiene, acrylonitrile, and acrylic acid; terpolymers of butadiene, vinylidene chloride, and methacrylic acid; copolymers of butadiene and methacrylic acid; and copolymers of isoprene and methacrylic acid.

7. Composition of claim 5 wherein said carboxylated rubber is selected from terpolymers of butadiene, acrylonitrile, and methacrylic acid; terpolymers of butadiene, styrene, and methacrylic acid; terpolymers of butadiene, acrylonitrile, and acrylic acid; terpolymers of butadiene, vinylidene chloride, and methacrylic acid; copolymers of butadiene and methacrylic acid; and copolymers of isoprene and methacrylic acid.

8. Composition of claim 7 wherein total amount of said chemical agent is 0.1 to 3 phr.

9. Composition of claim 1 wherein said chemical agent has the following structural formula:

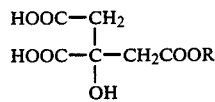

where R is said aliphatic group.

10. Composition of claim 5 wherein said chemical agent has the following structural formula

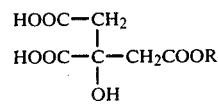

where R is said aliphatic group.

11. Composition of claim 10 wherein said agent is selected from monostearyl citrate, monolauryl citrate, monooleyl citrate, and mixtures thereof, and said carboxylated rubber is carboxylated nitrile rubber.

12. Process for improving scorch resistance and for reducing cure time of carboxylated rubber comprising distributing throughout said carboxylated rubber an effective amount for obtaining improved scorch resistance and shorter cure time of at least one chemical agent selected from saturated and unsaturated aliphatic monoesters, diesters, and mixtures thereof of citric acid, each of said aliphatic groups independently containing about 8 to 25 carbon atoms.

13. Process of claim 12 wherein said aliphatic groups each contain about 12 to 20 carbon atoms.

14. Process of claim 13 wherein amount of said chemical agent is in the range of about 0.1 to 5 weight parts per 100 parts of rubber (phr), said composition also including 0.5 to 10 phr of a metal oxide distributed throughout said rubber composition for the purpose of giving enhancement of abrasion resistance, tensile strength and tear strength.

15. Process of claim 14 wherein said metal oxide is selected from oxides of lead, and oxides of elements of Groups IIA and IIB of the periodic Table.

16. Process of claim 15 wherein said carboxylated rubber is selected from terpolymers of butadiene, acrylonitrile, and methacrylic acid; terpolymers of butadiene, styrene, and methacrylic acid; terpolymers of butadiene, acrylonitrile, and acrylic acid; terpolymers of butadiene, vinylidene chloride, and methacrylic acid; copolymers of butadiene and methacrylic acid; and copolymers of isoprene and methacrylic acid.

17. Process of claim 16 wherein said chemical agent is selected from monostearyl citrate, monolauryl citrate, monooleyl citrate, and mixtures thereof.

18. Process of claim 12 wherein said chemical agent is distributed throughout said carboxylated rubber by mixing said chemical agent into the emulsion of said carboxylated rubber prior to coaguation.

19. Process of claim 12 wherein said chemical agent is distributed throughout said carboxylated rubber which has been dried by mechanically mixing said agent into said carboxylated rubber.

20. Process of claim 16 wherein said chemical agent is monostearyl citrate, said metal oxide is zinc oxide, said carboxylated rubber is carboxylated nitrile rubber, and total amount of said chemical agent is 0.1 to 3 phr.

* * * * *

UNITED STATES PATENT AND TRADEMARK OFFICE
CERTIFICATE OF CORRECTION

PATENT NO. : 4,529,766
DATED : July 16, 1985
INVENTOR(S) : PHILIP H. STARMER

It is certified that error appears in the above-identified patent and that said Letters Patent are hereby corrected as shown below:

In Claim 1, Line 11, "carboxylic" should read --carboxylated--.

Signed and Sealed this

Fifteenth Day of October 1985

[SEAL]

Attest:

DONALD J. QUIGG

Attesting Officer

Commissioner of Patents and
Trademarks—Designate